Aug. 7, 1951 A. KOFF 2,563,534
CAPSULE AND PILL HANDLING DEVICE
Filed Nov. 7, 1947
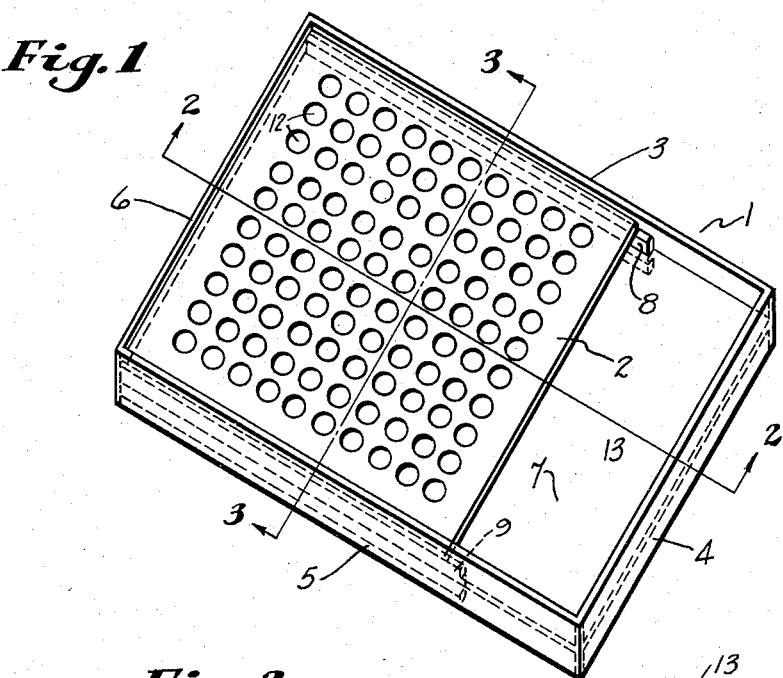
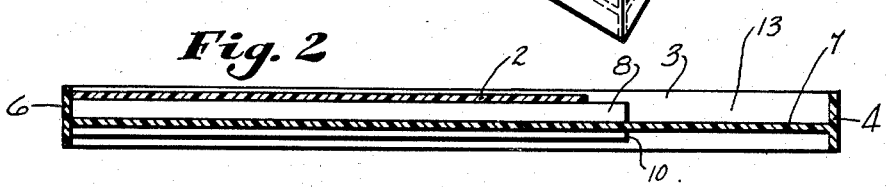
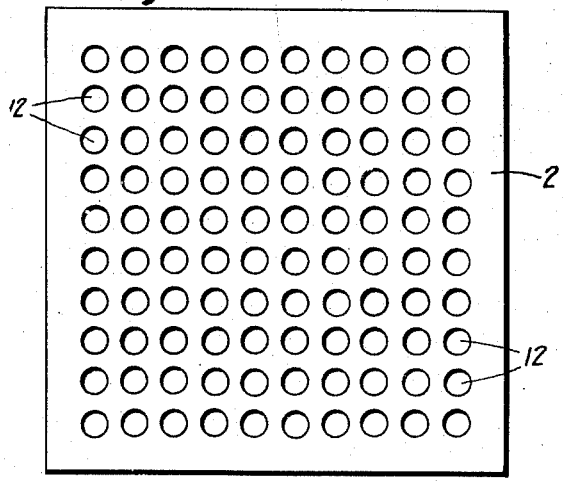
INVENTOR.
ALBERT KOFF
BY
Caesar and Rivise
ATTORNEYS

Patented Aug. 7, 1951

2,563,534

UNITED STATES PATENT OFFICE 2,563,534

CAPSULE AND PILL HANDLING DEVICE

Albert Koff, Philadelphia, Pa.

Application November 7, 1947, Serial No. 784,727

2 Claims. (Cl. 214—1)

The present invention relates to devices for handling capsules and pills, and has for its primary object the provision of an exceedingly simple, relatively inexpensive and sanitary device of this type.

In its essential details, the device of the invention consists of a rectangular tray and a rectangular perforated plate fitting within said tray and spaced above the bottom thereof. The perforations are arranged in rows and columns, and are each adapted to receive a capsule or pill.

The device is intended to be used by a pharmacist to hold capsules or pills as they are being made up or dispensed, so as to avoid repeated handling. The pharmacist by putting the pills or capsules in the apertures can at a glance tell how many have been made up, and if he should be interrupted during the dispensing operation he need not recount them manually.

Reference will now be had to the accompanying drawings, wherein is shown the presently preferred embodiment of the invention for illustrative purposes.

Figure 1 is a perspective view of the preferred embodiment;

Figure 2 is a cross-sectional view taken on line 2—2 of Figure 1;

Figure 3 is a cross-sectional view taken on line 3—3 of Figure 1;

Figure 4 is a fragmentary view similar to Figure 3, showing the device in inverted position; and Figure 5 is a plan view of the perforated plate which constitutes an essential element of the device.

As previously stated, the device of the invention consists essentially of a rectangular tray and a rectangular perforated plate fitting within said tray and spaced above the bottom thereof. The tray is denoted generally by the numeral 1, and the plate by the reference number 2. The plate is preferably formed separately from the tray, but I am not precluded from forming the two elements integrally. The tray has the four vertical walls 3, 4, 5 and 6, and the floor 7.

The floor 7 may be positioned so as to form the bottom of the device, or it may be somewhat raised above the bottom as shown in the drawing, thereby forming two trays, one of which is upside down. The floor in this case constitutes a partition between the two trays. The partition is preferably positioned so that the two trays are of somewhat different depths.

In order to space the apertured plate above the floor of the device, a set of side ledges is provided on each side of the partition. The ledges of one set are denoted by 8 and 9, and those of the other set by 10 and 11. The ledges may be in the form of strips secured to the side walls, but I prefer to form them integrally with the tray. The apertures in the plate, which are denoted by 12, are of a size to receive pills or capsules, and are arranged in rows or columns so that pills or capsules contained in the apertures can be counted at a glance.

The tray is preferably longer than it is wide, and the plate is preferably of square shape so that when the plate is disposed against one of the end walls, there is a space 13 between the plate and the other wall. This space may be used to temporarily hold pills or capsules until they are placed into the apertures.

The device is shown in one position in Figures 1, 2 and 3, and in inverted position in Figure 4. It will be understood that the height of the plate above the floor is such that part of the capsules or pills project above the plate. The fact that the two trays are of different depths renders it possible to use one device for a fairly wide range of sizes of capsules or pills.

The tray as well as the perforated plate may advantageously be made of a tough transparent material such as glass, or a synthetic or artificial plastic or resin, e. g. polymethyl methacrylate, polyethylene, cellulose acetate, and cellulose acetate butyrate. Not only do these materials permit of greater visibility, but they can be readily cleansed and sterilized. This is a very important consideration in the case of devices used in dispensing medicines.

It is not considered necessary to describe the manner of use of the device in any greater detail than has already been done. Suffice it to say, that after the number of holes corresponding to the desired number of pills or capsules have been filled, it is merely necessary to lift the plate, thereby depositing the capsules or pills on the floor 7. They can then be transferred directly from the tray into the pill box with a minimum of handling.

In conclusion, it is to be noted that the specific device shown in the drawing and described in the foregoing specification is merely exemplary and illustrative of the invention, and is not intended to restrict the invention beyond what is required by the state of the prior art.

I claim:

1. A capsule and pill handling device consisting of a rectangular vertical wall, a horizontal partition spaced intermediate the upper and lower ends of said wall, said partition dividing the device into two trays, and a rectangular plate adapted to fit within either of said trays when said tray is positioned upwardly, said plate being provided with a plurality of vertical apertures, each aperture being adapted to contain a capsule or pill.

2. The device defined in claim 1, said device being made of transparent material.

ALBERT KOFF.

REFERENCES CITED

The following references are of record in the file of this patent:

UNITED STATES PATENTS

| Number | Name | Date |
|---|---|---|
| 316,638 | Moore | Apr. 28, 1885 |
| 1,362,803 | Kondo | Dec. 21, 1920 |

FOREIGN PATENTS

| Number | Country | Date |
|---|---|---|
| 3,894 | Great Britain | Feb. 22, 1899 |
| 92,638 | Germany | July 1, 1897 |